Jan. 17, 1933.  A. L. WEIS  1,894,387

CHILD'S COMFORT TOILET SEAT

Filed Nov. 18, 1931  2 Sheets-Sheet 1

Inventor
Andrew L. Weis
By Henry E. Stauffer
his Attorney

Jan. 17, 1933.  A. L. WEIS  1,894,387
CHILD'S COMFORT TOILET SEAT
Filed Nov. 18, 1931  2 Sheets-Sheet 2
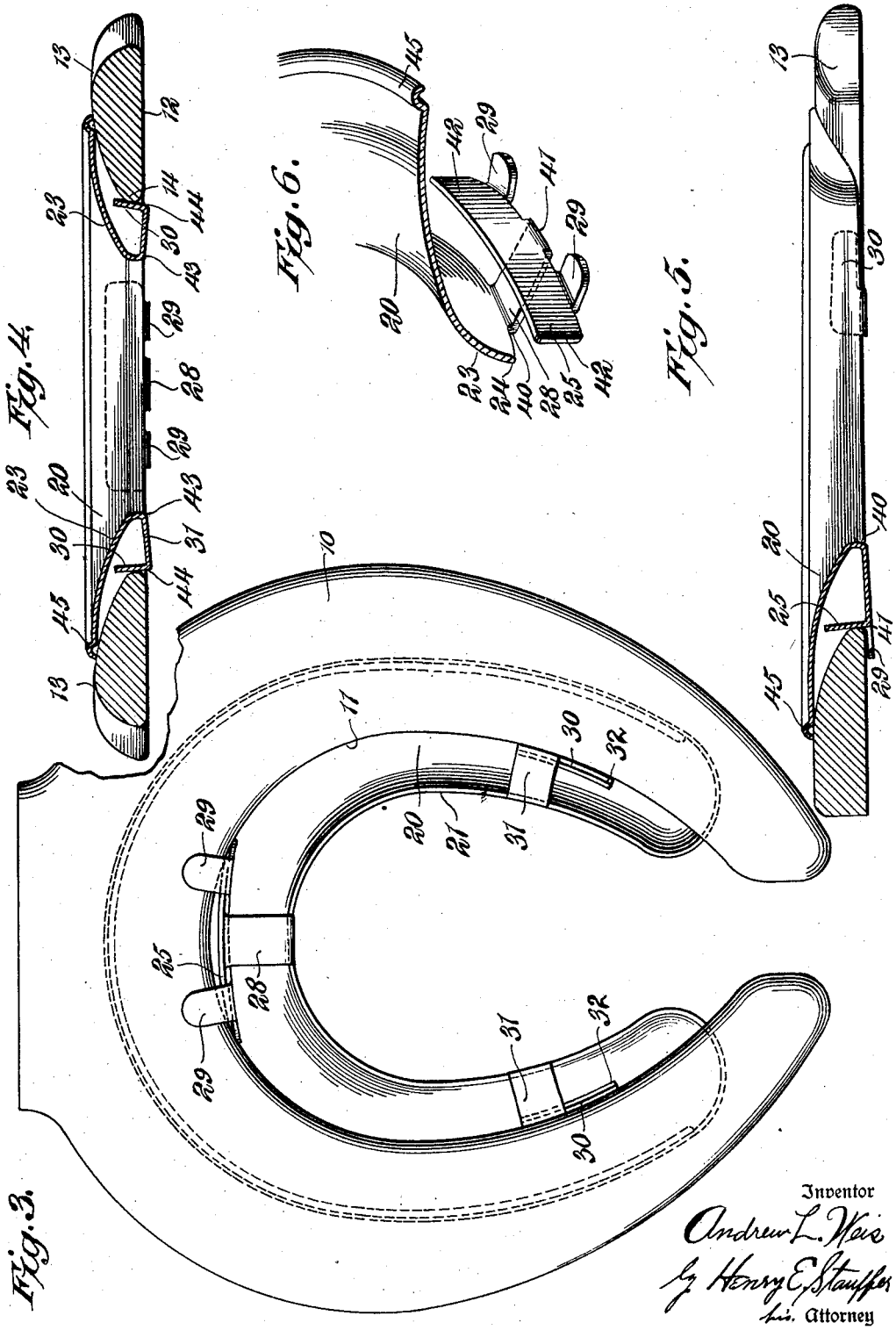

Patented Jan. 17, 1933

1,894,387

UNITED STATES PATENT OFFICE

ANDREW L. WEIS, OF FORT LAUDERDALE, FLORIDA

CHILD'S COMFORT TOILET SEAT

Application filed November 18, 1931. Serial No. 575,900.

The object of my invention is to provide a seat intended primarily for the use of children, and which shall be used as an auxiliary seat in conjunction with another seat of the usual size and shape. The seat is so constructed as to be readily attached to and removed from the standard seat, and yet be held firmly in place thereon by engaging devices which are of a resilient nature, and which, while holding the auxiliary seat firmly in position, yet permit the same to be easily placed on and removed from the standard seat.

My invention is preferably made from sheet steel or other suitable metal, pressed or otherwise worked into the proper shape. And the holding devices are preferably formed as an integral part of the sheet from which the seat is formed. But while the holding devices are preferably made from the sheet of which the seat is constructed, this is not the essence of the invention, and they may be constructed separately and secured thereto in any suitable manner.

Another object of the invention is to provide a seat the body of which shall be adapted to rest directly upon the top of the standard seat, while the walls of the opening therein shall be within the opening of the standard seat and extend to a plane approaching that of the bottom of the standard seat, so that the holding devices thereof, while adapted to engage the edge of the opening of the standard seat, yet lie in the same general plane of both the auxiliary seat and the standard seat, thus forming a structure which occupies little space, and so may be easily stored or carried in ordinary traveling bags or trunks.

These and other objects of the invention will be more fully understood from the accompanying drawings, which fully illustrate the invention, and from the description thereof which follows:

In the drawings:

Fig. 3 is a bottom or inverted plan view of a standard seat with my auxiliary seat applied thereto, and showing the holding devices in operative position.

Fig. 4 is a section through a standard seat with the auxiliary seat in position thereon and illustrating the side holding devices, the section being taken on the line 4—4 of Fig. 3, looking in the direction of the arrows.

Fig. 5 is a section similar to Fig. 4, but taken at substantially right angles thereto on the line 5—5 of Fig. 2, and looking in the direction of the arrows. It particularly illustrated the rear holding device in position.

Fig. 6 is a perspective view, with parts broken away, showing the rear holding device more in detail.

Figure 2:
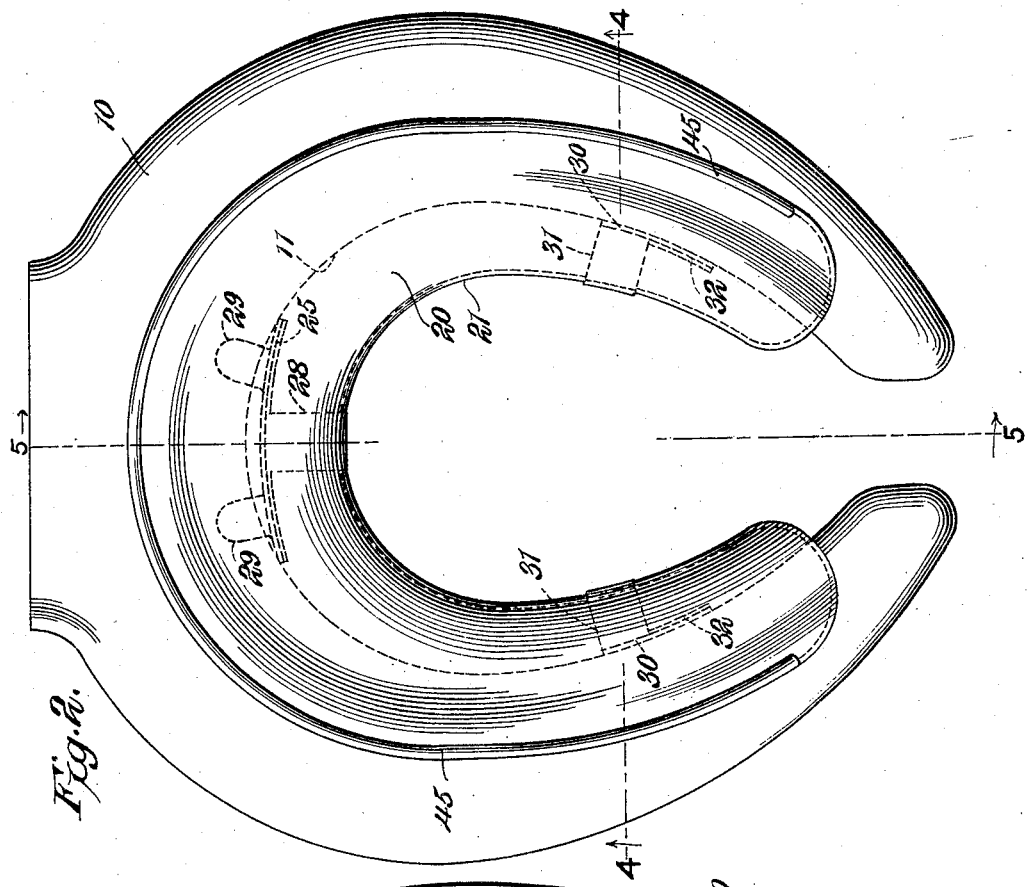
Fig. 2 is a top plan view of a standard toilet seat with my auxiliary seat resting thereon and secured thereto, the holding devices being shown in broken lines.

In the drawings, 10 represents any standard seat provided with the opening 11 of the usual size and shape. This may be of the open or closed front type, the open type being here illustrated. This seat as here shown, and as usually constructed, has a flat or substantially flat bottom 12, and a top with a thickened outer rim 13 and a thinner inner edge 14. The holding devices of my invention are designed to cooperate with the inner edge.

Resting on the standard seat, as shown in Fig. 2 and other figures, is the auxiliary seat 20 of my invention. The opening 21 of this seat, Figs. 2 and 3, is particularly designed for children's use and therefore is smaller than the opening of the standard seat; and the inner wall 23 thereof, Figs. 4 and 6, is so formed as to project well into the opening of the standard seat, so as to bring the lower edge 24 thereof into a plane more or less near that of the lower side of the standard seat.

Carried by the auxiliary seat 20, and preferably but not necessarily made integral therewith, are three holding and positioning devices, one 25 at the rear thereof, and one 30 on either side but toward the front thereof. The holding device 25 at the rear which is intended to engage the edge of the standard seat, is formed with a shank 28 by which it is secured to the body portion, and carries projections or tangs 29 extending from the body portion, one on either side of the shank 26. These projections 29 are intended to pass beneath the standard seat and so help to retain the auxiliary seat in position, as will be explained more in detail later in the specification. The other holding devices 30, which as stated are located near the front of the seat, are duplicates one of the other. Each consists of the body portion 30, mounted on a shank 31, by which it is attached to the body 20, and carries a lateral projection 32. These latter projections also are to engage with the edge of the opening of the standard seat, as will be later set forth.

Figure 1:
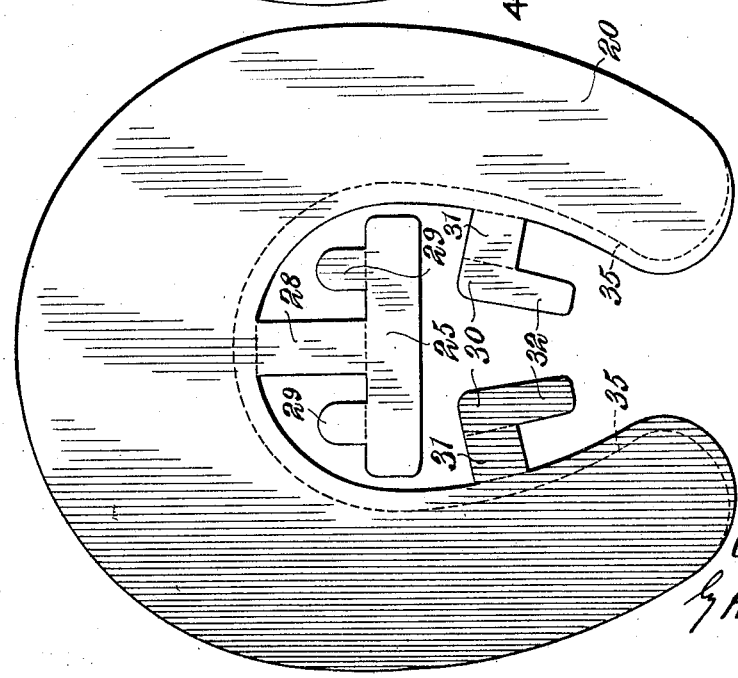
Fig. 1 is a plan view of the blank as it comes from the stamping press, the parts for the holding devices being shown as integral parts of the blank itself.

The sheet or blank from which the seat is formed is shown in Fig. 1 as it comes from the blanking press. The several parts of this blank bear the same reference characters as those used in the general description. This blank is operated upon by dies or other means until it assumes the general configuration shown in Figs. 4, 5 and 6. During these operations, the inner margin of the sheet, as shown in Fig. 1, is bent down, and the body thereof rounded, as shown at 23, Figs. 4 and 6, and the opening thereby enlarged to approximately that of the broken line 35 Fig. 1. As finished, the body assumes approximately the shape of the standard full sized seat, but is of smaller dimensions.

During the process of formation the holding devices 25 and 30 are brought to final shape. The holding device 25 at the rear is bent laterally at 40, Figs. 5 and 6, where it joins the body of the seat until it assumes a position making a small angle with respect to the general plane of the bottom margin of the seat, then the shank is again bent at 41 until the body 25 thereof stands at substantially right angles to the shank, and thus be in position at a small angle to the vertical. In this position it is adapted to engage the inner edge 11 of the standard seat. The projections or tangs 29 are bent laterally with respect to the body 25 so as to lie substantially in the plane of the shank 28.

This holding device 25 is somewhat elastic. It may be straight or only slightly curved as shown, so that it ends 42 come into contact with the edge of the opening 11 of the standard seat with a yielding pressure while the central part thereof does not contact therewith.

The side holding devices, 30, one on either side of the seat, are likewise bent laterally at 43 into a plane which forms a slight angle to the general plane of the seat, as shown best in Fig. 4, and the holding parts 30 and the extensions 32 are bent at 44 to a position substantially at right angles to the shanks and thus assume a position at a slight angle to the vertical.

A bead 45 is formed around the outer margin of the sheet which forms the auxiliary seat, and this serves both as a strengthening and stiffening rib, and also as an ornamental finish for the structure.

The metal from which the structure is fabricated is more or less resilient, and therefore the auxiliary seat as a whole adapts itself more or less to the shape of the standard seat. And the holding devices, being of the same material as the body, and preferably as a part thereof, have a certain amount of elasticity. This enables these holding devices to adapt themselves readily to seats of varying size. And these parts being flexible may be bent somewhat so as to adapt the seat to standard seats of varying sizes.

In using the auxiliary seat, the rear portion thereof is placed upon the top rear portion of the standard seat, and the projections 29 are pushed beneath the under surface 12 of the standard seat until the ends 42 of the body of the holder 25 rest against the margin of the opening 11 of the standard seat. A little extra pressure then applied will bend the piece 25. The front part of the seat is then forced in place with the engaging parts 30 and 32 thereof in contact with the margin of the opening 11. The elastic character of the rear holding device 25 is particularly important, for this being at first compressed when the auxiliary seat is placed in position, the pressure due to the resiliency thereof will tend to force the auxiliary seat as a whole forward, so that the holders 30 will engage the inner margin of the opening 11 with a yielding but firm pressure.

The projections 29 on the rear holder 25 not only serve to guide the rear of the seat and its holder to position, but also prevent the accidental lifting of the same in use.

Inasmuch as the shanks 28 and 31 of the holders 25 and 30 are so constructed as to form a small angle with the plane of the lower edge 24 of the opening of the auxiliary seat, and since the holding plates 25 and 30 are set at approximately right angles to the shanks, the faces of these holding devices will not be vertical to the general plane of the auxiliary seat, but will make a small angle therewith. As these holding plates contact the edge 14 of the opening 11 of the standard seat, and pressure is applied to the auxiliary seat, the shanks 28 and 31 of the holders will tend to straighten out, thus bringing pressure upon the holders and force the faces of the holders firmly against the edge of the opening 11 of the standard seat and at the same time bend or tend to bend the rear holding device 25.

To remove the auxiliary seat, it is only necessary to lift the front part thereof, and withdraw the projections 29 from beneath the rear of the standard seat.

In order to adapt the auxiliary seat to standard seats which may vary somewhat as to size of opening, the curvature of the rear holder 25 may be increased or diminished somewhat by bending the body 25, so that the structure as a whole can be made to fit seats whose openings vary within reasonable limits.

The seat is simple in construction, and complete within itself. There are no moving parts, or special locking or positioning devices, to become disarranged.

The character and type of the metal from which the seat is constructed is to be determined by the general necessities of the case, but ordinary sheet steel of 20 or 22 gauge is admirably suitable for the purpose. Any suitable finish may be applied.

Having thus fully described my invention, what I claim is:

1. As an article of manufacture, an auxiliary toilet seat constructed of resilient metal pressed to shape and having a child's opening therein the metal at the edge of the opening being depressed, and holding devices projecting from the edge of the depressed portion and at a small angle to the plane thereof which holding devices are adapted to engage the edge of the opening of a larger seat and hold the auxiliary seat in position thereon.

2. In combination, a standard closet seat having the usual opening therein, an auxiliary seat of resilient sheet metal having an opening of smaller size therein, the inner margin of which is depressed so that the same may rest within the opening of the larger seat, a resilient holding device at the rear thereof adapted to engage the edge of the opening of a seat of standard size, extensions on the holding device adapted to pass beneath the surface of the standard seat, and other resilient holding device one on either side of the front portion of the seat adapted to engage the edge of the standard seat, the holding device at the rear of the seat being of sufficient resiliency to force the front holders against the edge of the seat.

3. The combination of a standard toilet seat having the usual opening, of an auxiliary seat of resilient sheet metal having therein an opening of smaller size and having the metal forming the margin of the opening depressed until the lower edge thereof approximates the plane of the under surface of the standard seat, a holding device for the auxiliary seat integral therewith and projecting from the margin of the rear part of the opening at a small angle below the plane of the opening for engaging the edge of the rear part of the opening of the standard seat, and a plurality of other holding devices also integral with the auxiliary seat and extending therefrom at a small angle to the plane of the opening, so that as pressure is applied to the auxiliary seat the holding devices will tend to straighten and thus firmly engage the edge of the opening in the larger seat.

4. An auxiliary toilet seat having an opening of small size therein, the inner margin of the opening being depressed so that the same may rest within the opening of a larger seat, a resilient holding device at the rear of the opening adapted to engage the edge of the opening of a larger seat and having one or more extensions adapted to pass beneath the larger seat, and other resilient holding devices adapted to engage other portions of the opening of the larger seat.

5. As an article of manufacture, an auxiliary seat having an opening of small size therein and having the margin of the opening depressed until the lower edge thereof approximates the plane of the under surface of a standard seat, a resilient holding device secured to the seat and projecting from the rear part of the opening at a small angle to the plane of the seat for engaging the rear edge of the openings of a larger seat, one or more extensions carried by this holding device adapted to pass beneath a standard seat, and other resilient holding devices likewise extending at a small angle to the plane of the seat to engage the edge of the opening of the larger seat at other points.

ANDREW L. WEIS.